United States Patent [19]
Ogle

[11] Patent Number: 5,321,232
[45] Date of Patent: Jun. 14, 1994

[54] OVEN CONTROLLED BY AN OPTICAL CODE READER

[75] Inventor: Lyle Ogle, Memphis, Tenn.

[73] Assignee: Amana Refrigeration, Inc., Del.

[21] Appl. No.: 816,973

[22] Filed: Jan. 3, 1992

[51] Int. Cl.⁵ .................................... H05B 1/02
[52] U.S. Cl. ................................ 219/506; 219/497; 219/494; 219/714; 219/719; 99/325; 99/342
[58] Field of Search ............... 219/10.55 B, 506, 501, 219/497, 492, 499, 494; 99/325, 329, 328, 342

[56] References Cited

U.S. PATENT DOCUMENTS

| | | | |
|---|---|---|---|
| 3,869,599 | 3/1975 | Sansone | 235/61.11 |
| 3,920,959 | 11/1975 | Wefers et al. | 235/61.11 |
| 4,162,381 | 7/1979 | Buck | 219/10.55 |
| 4,236,055 | 11/1980 | Kaminaka | 219/10.55 |
| 4,323,773 | 4/1982 | Carpenter | 235/473 |
| 4,405,991 | 9/1983 | Stanley | 364/715 |
| 4,613,942 | 9/1986 | Chen | 364/513 |
| 4,744,034 | 5/1988 | Milstein | 364/464 |
| 4,780,488 | 10/1988 | Edamura | 219/10.55 |
| 4,782,448 | 11/1988 | Milstein | 364/464 |
| 4,816,635 | 3/1989 | Edamura | 219/10.55 B |
| 4,837,414 | 6/1989 | Edamura | 219/10.55 |
| 5,130,518 | 7/1992 | Merle | 219/497 |
| 5,147,068 | 9/1992 | Wright | 219/10.55 B |

*Primary Examiner*—Mark H. Paschall
*Attorney, Agent, or Firm*—Senniger, Powers, Leavitt & Roedel

[57] ABSTRACT

A programmable cooking system has a programming mode for reading an identifying code on a food product and for storing a user selected recipe as a function of the code. The system also has a cooking mode for reading an identifying code on a food product and for recalling and implementing a recipe stored for the code during the programming mode. The system includes an optical code reader for reading the code. A keypad is used by the operator to input recipes during the programming mode and to input cooking variables during the cooking mode. A microprocessor stores and recalls the identifying codes and recipes in a compressed format and controls the operation of a cooking device, such as a microwave oven.

29 Claims, 11 Drawing Sheets

OVEN CONTROLLED BY AN OPTICAL CODE READER

BACKGROUND OF THE INVENTION

The present invention relates to a recipe implementation system for a cooking device and, more particularly, to a programmable recipe implementation system for automatically controlling the operation of a microwave oven according to a recipe input by the user and stored as a function of an identifying code commonly found on food products.

Recipe implementation systems have been used with cooking devices in past applications. However, they have required the user to maintain a recipe book and they have not allowed the user to implement original recipes. For instance, Edamula in U.S. Pat. No. 4,837,414 and Edamura in U.S. Pat. No. 4,816,635 show a cookbook containing coded recipes which may be scanned into the system for controlling a microwave oven. Accordingly, there is a need for a programmable recipe implementation system for a cooking device which allows the user to implement original recipes without resort to cookbooks.

SUMMARY OF THE INVENTION

Among the objects of the present invention may be noted the provision of a recipe implementation system which controls a cooking device according to a user input recipe which is stored and recalled as a function of an identifying code; the provision of such a system where the identifying codes are commonly found on food products; the provision of such a system using an optical code reader to read the identifying codes; the provision of such a system where the identifying code is a bar code; the provision of such a system where the identifying codes and recipes are stored in a compressed format; the provision of such a system having a keypad used by an operator for inputting recipes; and the provision of such a system having a keypad used by an operator for inputting cooking variables.

Generally, in one form the invention provides a programmable cooking system for use with a cooking device and a plurality of food products, each food product bearing an identifying code. The cooking system comprises a memory and means for reading the identifying code on a selected one of the food products. The cooking system further comprises programming means for inputting into the memory a sequence of cooking instructions corresponding to the identifying code read by the reading means and means for recalling the sequence of cooking instructions input into the memory by the programming means as a function of the selected identifying code read by the reading means. The cooking system further comprises means for controlling the operation of the cooking device as a function of the sequence of cooking instructions recalled by the recalling means. The cooking system may include a reading means comprising a bar code reader or other optical code reader. The cooking system may also include a programming means comprising means for compressing the sequences of cooking instructions and for inputting them into the memory in a compressed format. The cooking system may also include a recalling means comprising means for recalling the sequences of cooking instructions in a compressed format and for expanding them into a format compatible for use by the controlling means.

In another form of the invention, an automatic cooking system for use with a plurality of food products, each bearing an identifying code, comprises a cooking device, a memory, an optical code reader for reading the identifying codes on a selected one of the food products, programming means for inputting into the memory a sequence of cooking instructions corresponding to the identifying code read by the optical code reader, means for recalling the sequence of cooking instructions input into the memory by the programming means as a function of the selected identifying code read by the optical code reader, and means for controlling the operation of the cooking device as a function of the sequence of cooking instructions recalled by the recalling means. The cooking system may include a cooking device comprising a microwave oven. The cooking system may also include programming means comprising means for entering a base amount of food to be cooked in a set of cooking instructions. The controlling means comprises means for inputting a value representative of the actual amount of food to be cooked in a given operation of the cooking device. The controlling means controls the cooking device as a function of the base amount and the actual amount.

In still another form of the invention, a Programmable cooking system for use with a plurality of food products, each bearing an identifying code, comprises a cooking device having controls for controlling the operation of the cooking device; an optical code reader for reading the identifying code on a selected one of the food products; a keypad; a memory; and a microprocessor including an input connected to the optical code reader, the keypad and the memory, and having an output connected to the memory and the controls and having a programming mode and an operating mode. In the programming mode, the microprocessor stores in memory identifying codes read by the optical code reader and corresponding cooking instructions input via the keypad by an operator. In the operating mode, the microprocessor retrieves from the memory cooking instructions corresponding to an identifying code read by the optical code reader. The microprocessor controls the controls of the cooking device in accordance with retrieved cooking instructions whereby the operator stores in the memory cooking instructions corresponding to a particular identifying code and the operation of the cooking device is controlled in response to cooking instructions corresponding to the particular identifying code read by the optical code reader.

Other objects and features will be in part apparent and in part pointed out hereinafter.

DETAILED DESCRIPTION OF PREFERRED EMBODIMENTS

The present invention is embodied in a programmable recipe implementation system for cooking devices, and especially for microwave ovens. Therefore, with reference to FIG. 1, a cooking system for automatically controlling the operation of a cooking device 112 to cook food products bearing identifying codes according to preprogrammed recipes is illustrated.

Embodiments of the present invention may include a microwave oven with a microprocessor, memory, code reader, and related control apparatus. Additional embodiments may include other types of cooking devices such as convection ovens, portable ovens, and frying apparatus. The present invention may be used with any prepackaged food products bearing identifying codes such as the commonly found universal product codes ("UPC") which appear on many products in a bar code format. The present invention may also be used with commonly found optical character recognition systems or with unpackaged food products so long as the user has an identifiable code associated with each such food product.

In order to use the embodiments described herein, a product code or identifying mark (hereinafter "product code") is read into the memory and then a sequence of cooking instructions for the corresponding food product is read into the memory and associated with the product code. This process may be repeated several times, thus creating a table in the memory of product codes and associated recipes for various food products. When the user later desires to cook food for which a recipe has been previously stored for its code, the user scans the product code and places the food product in the oven. The oven will then automatically cook the food according to the programmed recipe.

Improvements on the embodiment enable the user to input a value representing the amount of food to be cooked at the time of cooking. The invention then scales the cooking times in the recipe as a function of the amount so input according to mathematical formulas which are commonly available. A further improvement adjusts for the cooking of food which is initially frozen by adding a defrost cycle at the beginning of the recipe. The user indicates that the food is frozen be adding an "f" after the amount term, e.g. "0.5 f" for 0.5 lbs. of frozen hamburger. Those skilled in the art will recognize that the cooking times and/or power settings in the recipe could also be adjusted as an alternative method of handling frozen food. As an aside, for foods which are always frozen before cooking, the cooking times and power settings in the recipe can be set to account for the frozen condition without resort to the "F" nomenclature in the amount variable.

A further improvement on the embodiment includes apparatus for compressing the information stored in the memory to allow a greater number of recipes to be stored. Upon retrieval from the memory, the compressed data is expanded into a format suitable for controlling the operation of the cooking device.

Figure 1:
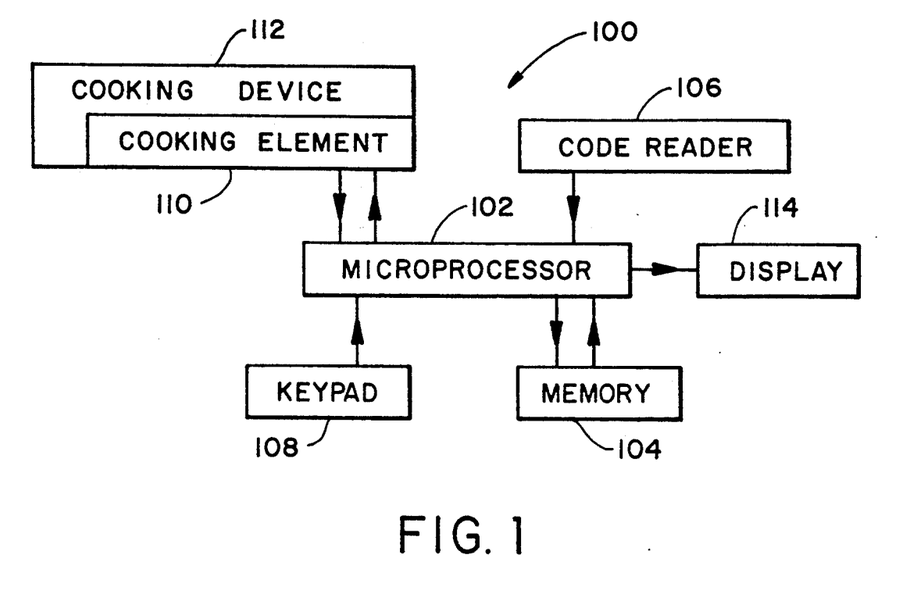
FIG. 1 illustrates a block diagram for a system according to the present invention.

FIG. 1 illustrates a block diagram for a system 100 of the present invention. System 100 includes a microprocessor 102 which monitors and controls all of the other elements. Microprocessor 102 is connected to a memory 104 including, for example, E²PROM, flash memory, ROM, or RAM, for storing recipes, product codes, and software. Memory 104 is preferably nonvolatile. Microprocessor 102 compresses and then stores the product codes and recipes in memory 104. Microprocessor 102 is programmed to recall the compressed recipes based on the product code of the respective food product. Microprocessor 102 then expands the recalled recipes into a format suitable for controlling the operation of cooking element 110. A code reader 106 may be any commonly found code reader, such as an optical bar code reader. Code reader 106 reads the product codes and converts them to digital signals for transmission to and further processing by microprocessor 102.

A key pad 108 may be the key pad found on any common microwave oven or it may be a second key pad used exclusively with system 100. In either event, key pad 108 is used to input the recipes, food amounts, and any other user inputs to microprocessor 102. A cooking element 110 in cooking device 112 is monitored and controlled by microprocessor 102. Microprocessor 102 thereby controls the power output of cooking element 110 and controls the duration of the related cooking cycle according to a recipe recalled from memory 104. Cooking device 112 also includes a door, not shown, for allowing access to the cooking chamber. During the operation of the hardware in FIG. 1, microprocessor 102 outputs user prompts on display 114.

Figure 2:
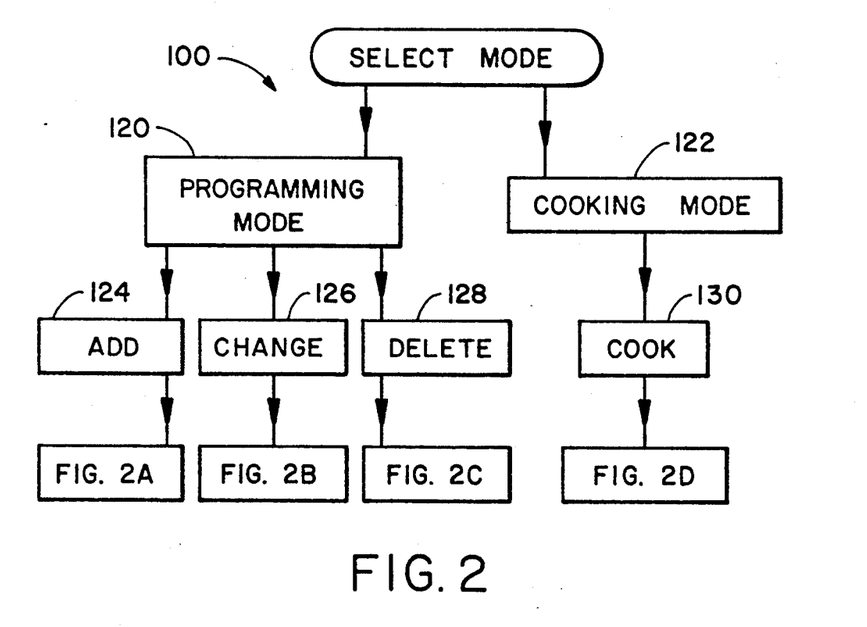
FIGS. 2, 2A, 2B, 2C and 2D illustrate flow charts showing the steps implemented by the system of FIG. 1.

FIG. 2 and related FIGS. 2A, 2B, 2C, and 2D contain flow charts which show the steps implemented by the hardware of FIG. 1. The reference numerals from the hardware in FIG. 1 have been added to the steps of FIGS. 2 through 2D where appropriate. In FIG. 2, the user initiates a programming mode 120 or a cooking mode 122 by depressing a switch labeled ADD 124, CHANGE 126, DELETE 128 or COOK 130. The first three switches initiate programming mode 120 and COOK switch 130 initiates the cooking mode 122.

Figure 2A:
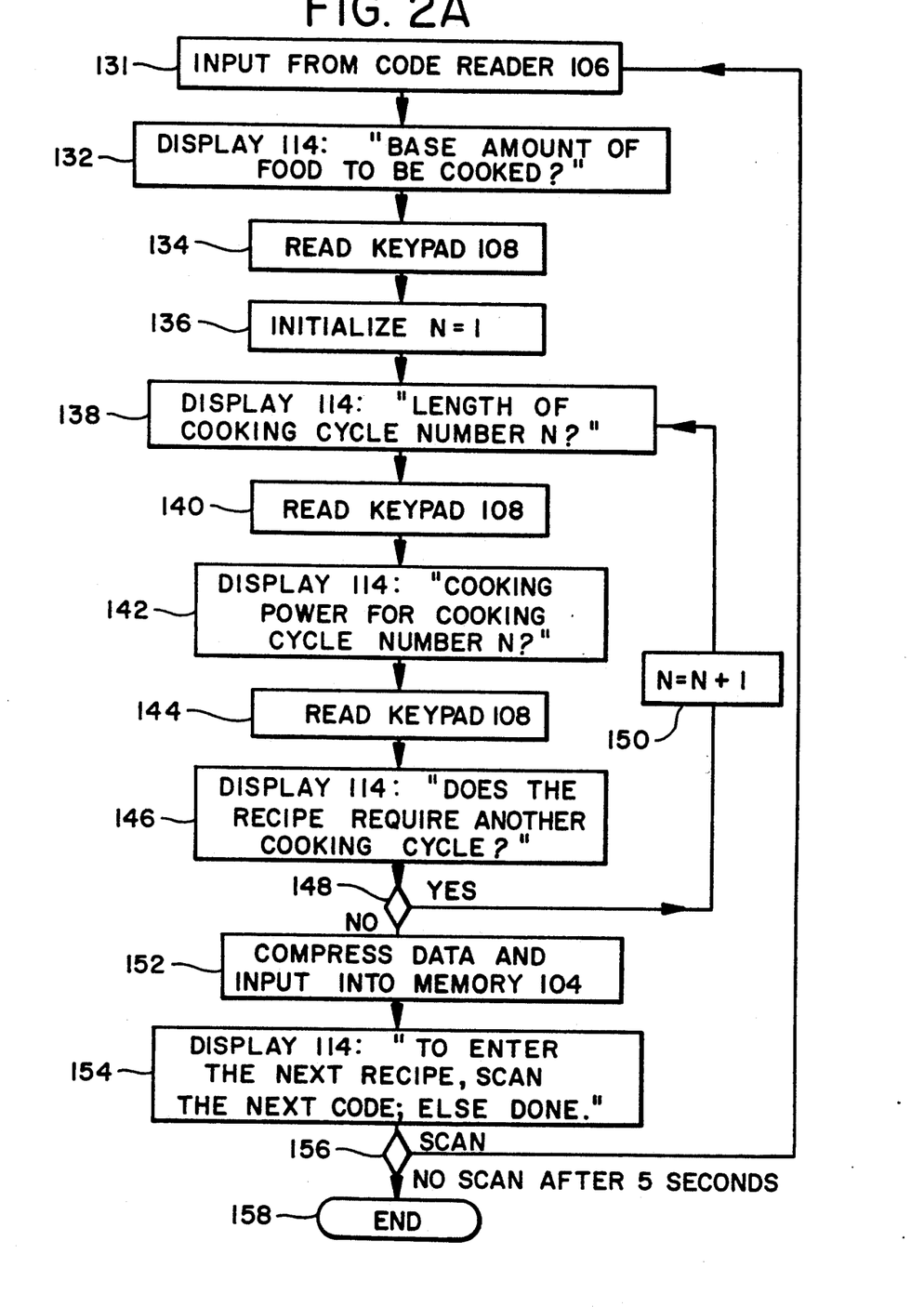
Figure 2B:
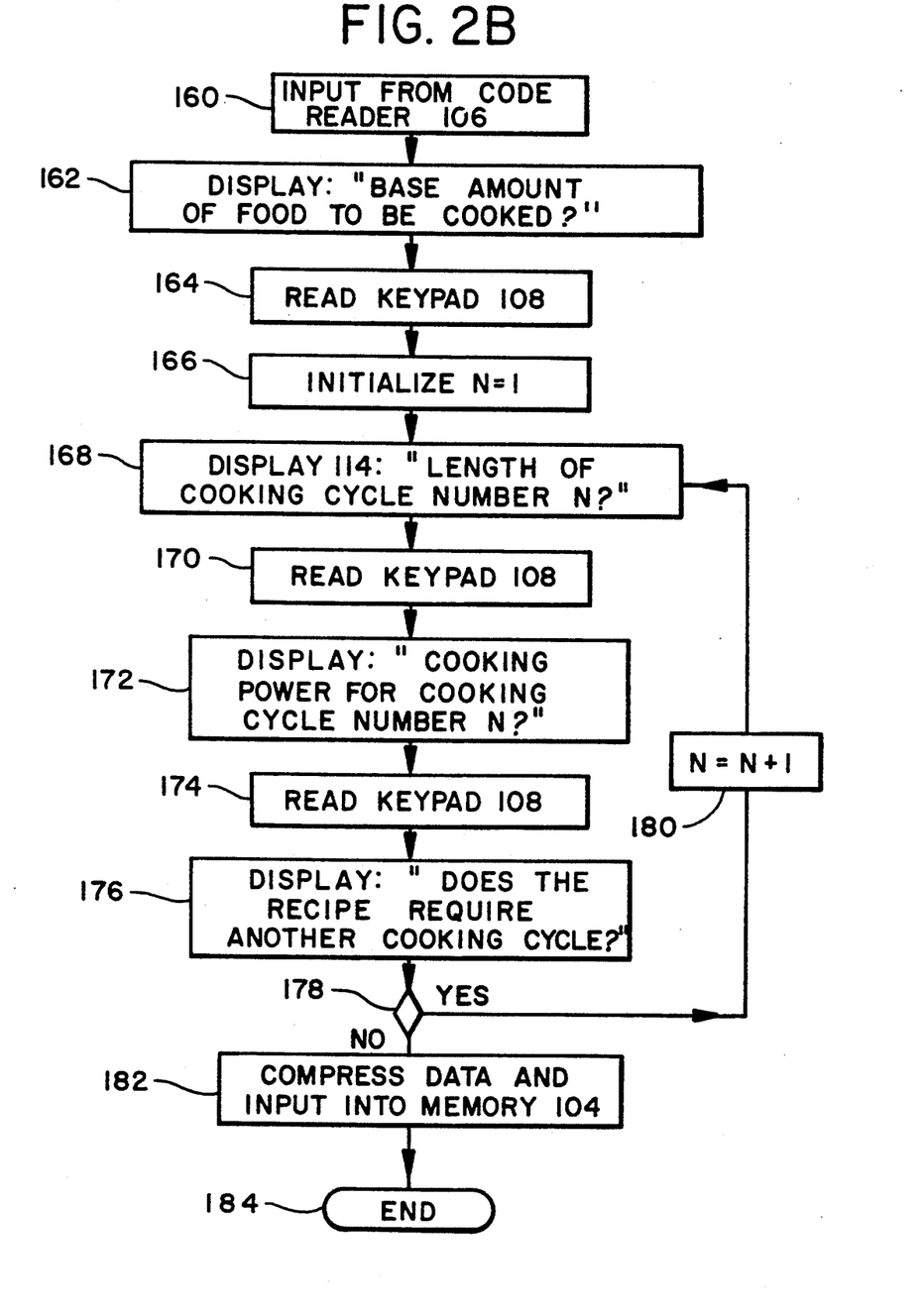
Figure 2C:
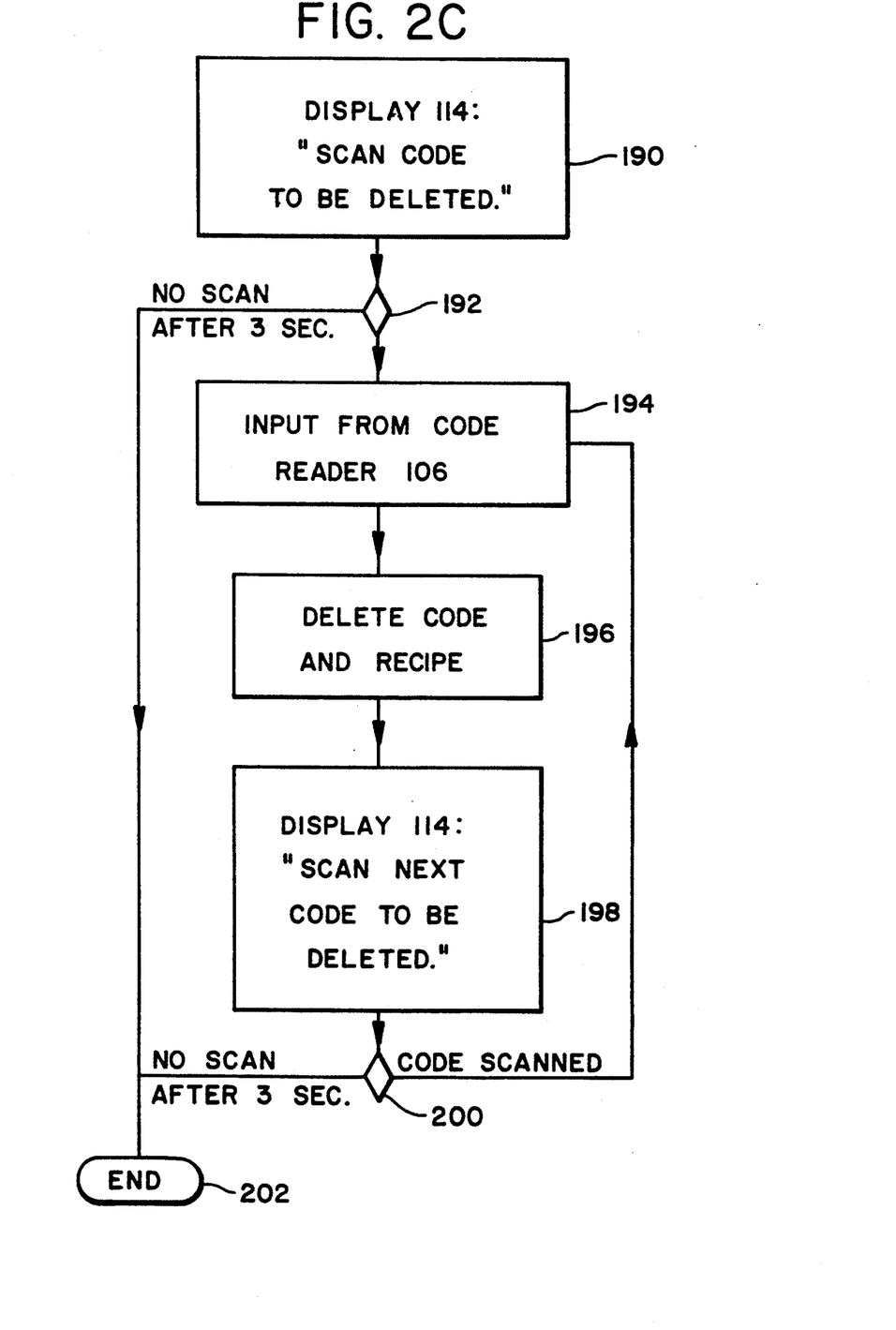

When ADD switch 124 is depressed, cooking system 100 may be programmed with a new recipe. As illustrated in FIG. 2A, the user scans the product code such as the UPC code on the food product with code reader 106 in step 131. Upon reading the input, microprocessor 102 outputs the following user prompt on display 114 in step 132: "BASE AMOUNT OF FOOD TO BE COOKED?" The user responds by inputting through key pad 108 in step 134 the amount of food the user will most commonly use with the recipe. For instance, if the user routinely cooks 10 hot dogs at a time, the user may input the number 10 at step 134. If the user routinely cooks 0.5 lbs. of hamburger at a time, the user may input the number 0.5 at step 134.

Microprocessor 102 initializes variable N to 1 in step 136. N is the variable used to identify the particular cooking cycle within a recipe containing more than one cooking cycle. In step 138, microprocessor 102 outputs the user prompt on display 114: "LENGTH OF COOKING CYCLE NUMBER 1?" (N equals 1 on the first pass). The user then inputs the length of the first cooking cycle in the recipe through key pad 108 in step 140. In step 142, display 114 outputs the user prompt: "COOKING POWER FOR COOKING CYCLE NUMBER 1?" The user then inputs the power setting for the first cooking cycle at step 144. If the desired recipe requires several cooking cycles, step 146 is used to add the additional cycles. In step 146, display 114 outputs the user prompt: "DOES THE RECIPE REQUIRE ANOTHER COOKING CYCLE?" If the user response at step 148 is "YES," microprocessor 102 increments N by 1 at step 150 and resumes operating at step 138. Microprocessor 102 then repeats steps 138 to 146 a second time with N equal to 2. A second cooking cycle is thereby stored for the recipe. If a third cooking cycle and so on is required, microprocessor 102 repeats the sequence of steps 138 to 146 until all cooking cycles have been input. After the last cooking cycle has been input, the user input at step 148 is "NO" and microprocessor 102 proceeds to step 152.

In step 152, microprocessor 102 compresses all of the data for the product code and the related recipe from the preceding steps 130 to 150 and inputs the compressed data into memory 104 of FIG. 1. The data compression techniques used are commonly known to those skilled in the art and are not discussed further.

In step 154, microprocessor 102 determines whether the user desires to enter additional recipes. In step 154, display 114 outputs the user prompt: "TO ENTER THE NEXT RECIPE, SCAN THE NEXT CODE; ELSE DONE." In step 156, microprocessor 102 determines whether the user scans another food product with code reader 106 in step 130. If the user scans another food product, microprocessor 102 resumes operating at step 130 and the recipe for the new food product is ready to be input. If microprocessor 102 detects nothing at step 156 for five seconds, the programming mode ends at step 158.

If the user wishes to change an existing recipe in memory 104, the user depresses CHANGE switch 126 in FIG. 2. Microprocessor 102 then performs steps 160 through 182 in FIG. 2B. Steps 160 through 182 correspond exactly to steps 130 through 152 as described above in FIG. 2A. The programming mode for changing a recipe ends at step 184.

If the user wishes to delete an existing recipe in memory 104, the user depresses DELETE switch 128 in FIG. 2. Microprocessor 102 then performs steps 190 through 200 in FIG. 2C. In step 190, display 114 outputs the user prompt: "SCAN CODE TO BE DELETED." If the user scans a product code within 3 seconds, microprocessor 102 passes through step 192 and the code is read in step 194 with code reader 106. In step 196, microprocessor 102 locates the product code and related recipe in memory 206 and deletes both. This frees the space in memory 206 for the storing of other product codes and recipes. In step 198, display 114 outputs the user prompt: "SCAN NEXT CODE TO BE DELETED." If the user scans another product code, microprocessor 102 passes through step 200, returns to step 194, and deletes the scanned product code and related recipe. Microprocessor 102 continues this operation until the user has scanned all product codes to be deleted. If no product code is scanned for 3 seconds in either step 192 or step 200, the programming mode ends at step 202.

Figure 2D:
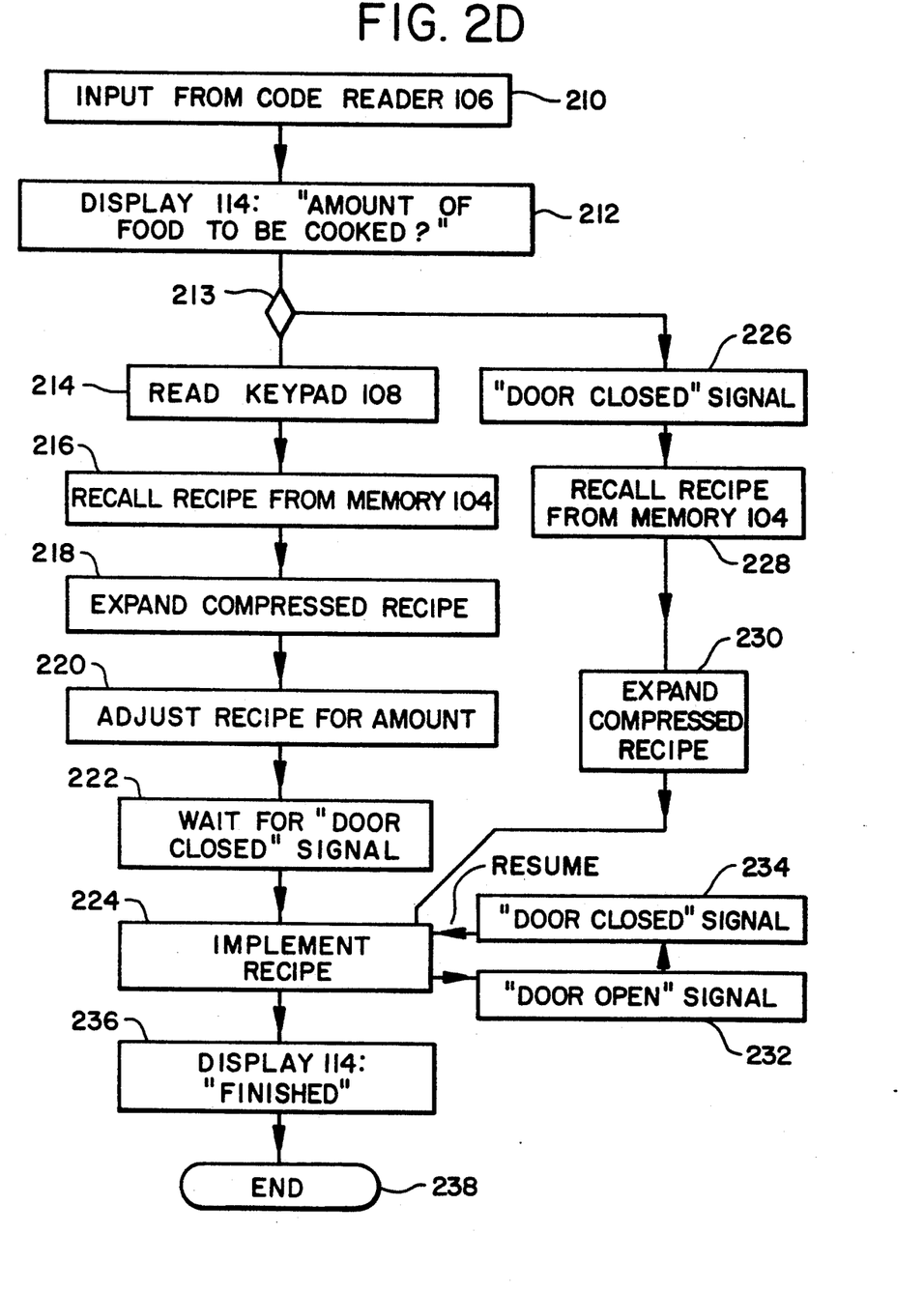

After one or more recipes have been stored, microprocessor 102 is ready to control the operation of cooking device 112 in the cook mode according to a stored recipe as shown in the flow chart of FIG. 2D. The cook mode begins when a user presses the "COOK" switch 130 in FIG. 2. The user then scans the product code on the food Product to be cooked with code reader 106 in step 210 of FIG. 2D. In step 212, display 114 outputs the user prompt: "AMOUNT OF FOOD TO BE COOKED?" Microprocessor 102 then looks for one of two signals at step 213, an input from the key pad 108 in step 214 or a door close signal in step 226.

If microprocessor 102 receives a first input in step 214, the input represents the amount of food to be cooked. Microprocessor 102 then recalls the recipe from memory 104 in step 216 which corresponds to the product code read in step 210. Having recalled the recipe, microprocessor 102 expands the recipe in step 218 into data usable for controlling the operation of the cooking element 110. In step 220, microprocessor 102 scales the recipe for the amount of food to be cooked according to the amount input in step 214. The scaling is calculated using well-known formulas. If the amount input is followed by the letter "f" indicating frozen food, microprocessor 102 may add a defrost cycle at defrost power at the beginning of the recipe. The duration of the defrost cycle is also calculated using well-known formulas. After all of the adjustments to the recipe have been calculated and after the user inserts the food product in cooking device 112 and closes the door, step 222 signals that the door has been closed and microprocessor 102 begins executing the recipe in step 224.

Going back now to step 212, microprocessor 102 may receive a door closed signal in step 226 instead of an input from key pad 108 in step 214. In this event, microprocessor 102 proceeds to step 228 by recalling the compressed recipe from memory 104 which recipe corresponds to the product code read in step 210. Microprocessor 102 then expands the compressed recipe into data usable for controlling the operation of cooking element 110 in step 230. Microprocessor 102 begins implementing the recipe in step 224.

The flow chart beginning at step 226 may be used for the most common amount of food to be cooked with the recipe. For example, if hot dogs come in a package of ten and the user always cooks all ten hot dogs, then the user will want to program the recipe for cooking ten hot dogs. This is done in the programming mode of FIG. 2A by programming the base amount of food in step 132 as "10." To cook the hot dogs, the user merely presses the COOK key, scans the product code with code reader 106, places the ten hot dogs in cooking device 112 and shuts the door. The recipe will be automatically implemented. The flow chart branch beginning with step 214 may be used for differing amounts of food.

After cooking device 112 begins cooking according to a recipe in step 224, the user may open the door. If cooking device 112 is a microwave oven, all microwave power will be automatically shut off by the door open signal received in step 232. Microprocessor 102 then waits for a door closed signal in step 234 before resuming implementation of the recipe in step 224. After a recipe has been fully implemented, display 114 outputs the user prompt "FINISHED" in step 236 and the program ends in step 238. System 100 is now ready to be programmed with additional recipes or is ready to implement recipes which have already been stored.

Figure 3:
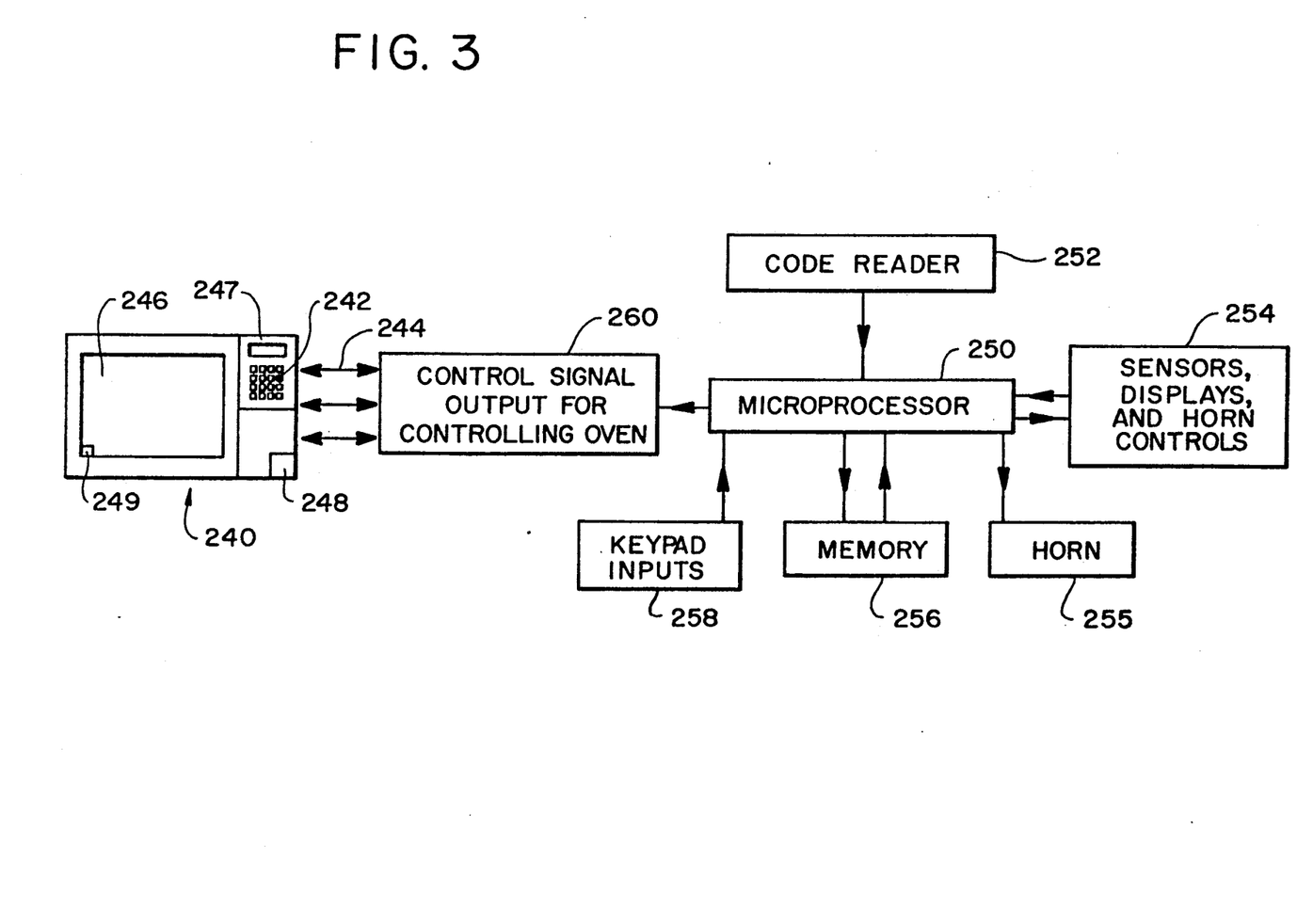
FIG. 3 illustrates a block diagram for retrofitting an existing microwave oven with a system according to the present invention.

FIG. 3 shows a block diagram for retrofitting an existing microwave oven, and particularly a Litton Model FS-10 EVP.C microwave oven (hereinafter "commercial oven 240"), with the present invention. FIG. 3 includes a microprocessor 250 for storing recipes during a programming mode and for controlling the operation of commercial oven 240 through electrical connection 244 to the reverse side of a key pad 242 commonly found on commercial oven 240. Commercial oven 240 also includes a door 246, door open detector circuitry 249, a display 247, and a horn 248.

The rest of FIG. 3 includes a code reader 252 which may be any commonly used optical code reader or other code reader. Block 254 includes sensors and controls connected to the circuitry of the commercial oven 240 for determining whether door 246 is open or closed, and for controlling user prompts from display 247 and horn 248. Horn 255 is a second horn for creating user prompts in addition to horn 248. Memory 256 contains additional storage space for microprocessor 250. Memory 256 is Preferably nonvolatile. Key pad 258 is a separate key pad from key pad 242. Key pad 258 is used exclusively for providing inputs for the present embodiment. Block 260 represents the apparatus for outputting control signals over communication link 244 whereby microprocessor 250 controls the commercial oven 240 through key pad 242.

FIGS. 4–9 illustrate a schematic diagram for implementing the block diagram of FIG. 3 on commercial oven 240. FIGS. 4–9 thus illustrate a different embodiment of the present invention from that disclosed in FIGS. 1 and 2 and described above. It will be understood by those skilled in the art that yet other embodiments could be practiced within the scope of the invention. Connections between the figures are determined by matching the 900 series numbers on corresponding terminals and will not be discussed further. It will be noted that the circuitry of FIGS. 4–9 uses optical couplers for all of the interfaces with the circuitry in commercial oven 240. This is done to isolate electrically the two sets of circuitry. Finally, the hardware reference numerals of FIG. 3 have been carried over to FIGS. 4 through 9 as appropriate.

Figure 4:
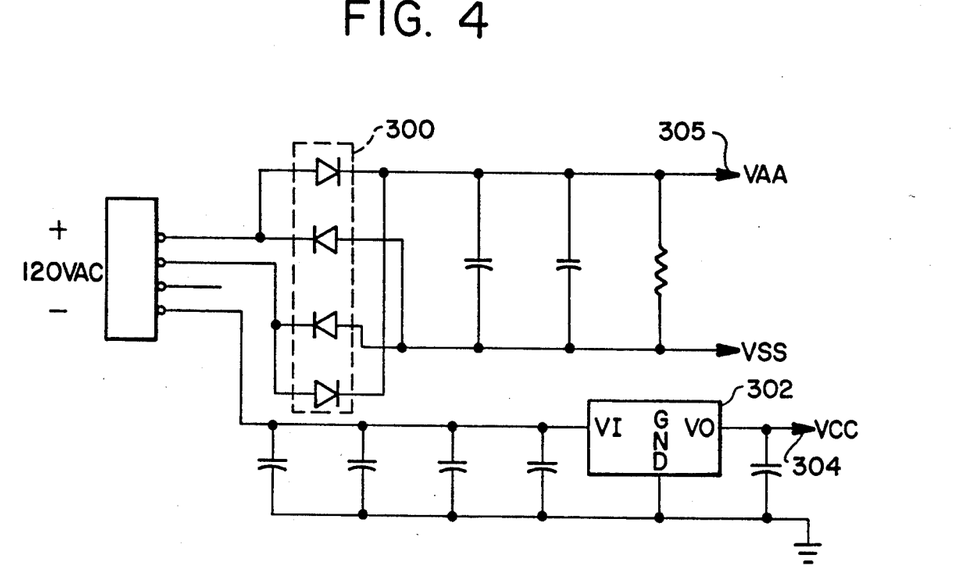
FIGS. 4-9 illustrate a schematic diagram for implementing the block diagram for FIG. 3 for a commercial oven.

FIG. 4 shows a power supply circuit of common configuration for powering the circuitry of FIGS. 5–9. The diodes within dashed line 300 provide full wave rectification of the 120 volt power source. Terminal 305, also marked VAA, provides a nominal 18–20 volt dc output. Voltage regulator 302 provides a nominal 5 volt dc output at terminal 304, also marked VCC. The remaining capacitors and the one resistor are configured to filter away alternating current components from the power supply outputs.

Figure 5:
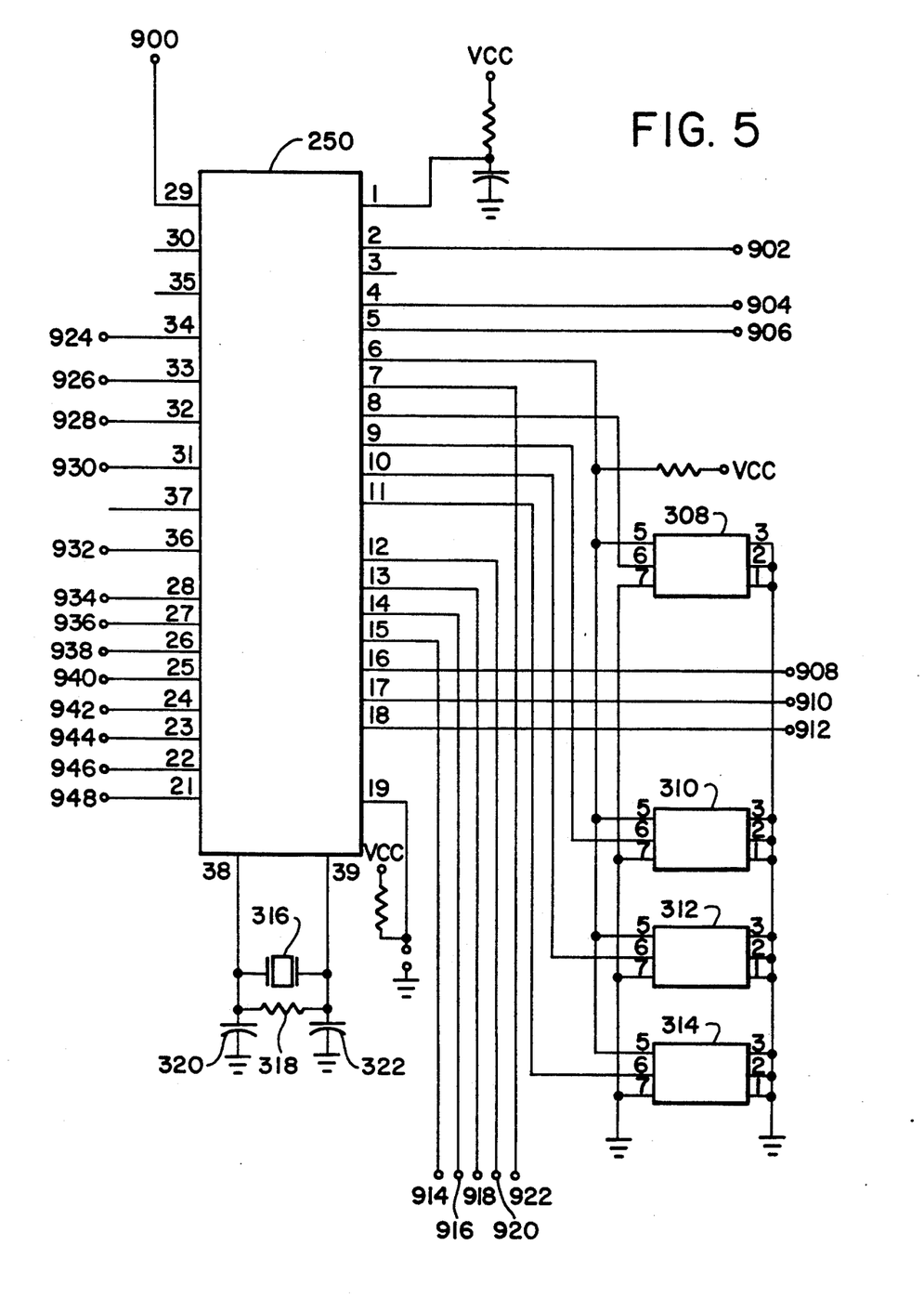

FIG. 5 shows microprocessor 250 which is preferably integrated circuit MC68HC705C85 manufactured by Motorola Semiconductor, Inc. Microprocessor 250 is connected to additional nonvolatile memory 308, 310, 312, and 314, such as E$^2$PROM, by conventional means. Memory 308, 310, 312, and 314 corresponds to memory 256 in FIG. 3. The additional memory stores the product codes and recipes for a maximum of 256 different items. The frequency of operation for microprocessor 250 is set by crystal 316 and related resistor 318 and capacitors 320 and 322. Crystal 316 preferably oscillates at a frequency of 4 MHz. Microprocessor 250 is connected to code reader 252 of FIG. 6 through pin 29. The identifying codes on the various food products are thereby input into microprocessor 250. Microprocessor 250 is connected to the circuitry of FIG. 7 through pins 2, 4, 5, 16, 17, and 18. The circuitry of FIG. 7 thereby provides information to microprocessor 250 concerning certain operating conditions in commercial oven 240. Microprocessor 250 also controls certain user prompts on commercial oven 240, including horn 248 and display 247, through the circuitry of FIG. 7, as more fully described below. Microprocessor 250 is also connected to a second key pad 258 through the circuitry of FIG. 8. Key pad 258 is only used during the programming mode. Finally, microprocessor 250 controls the operation of commercial oven 240 through key pad 242 and the circuitry of FIG. 9. FIG. 9 is connected to pins 21 through 28 of microprocessor 250.

Figure 6:
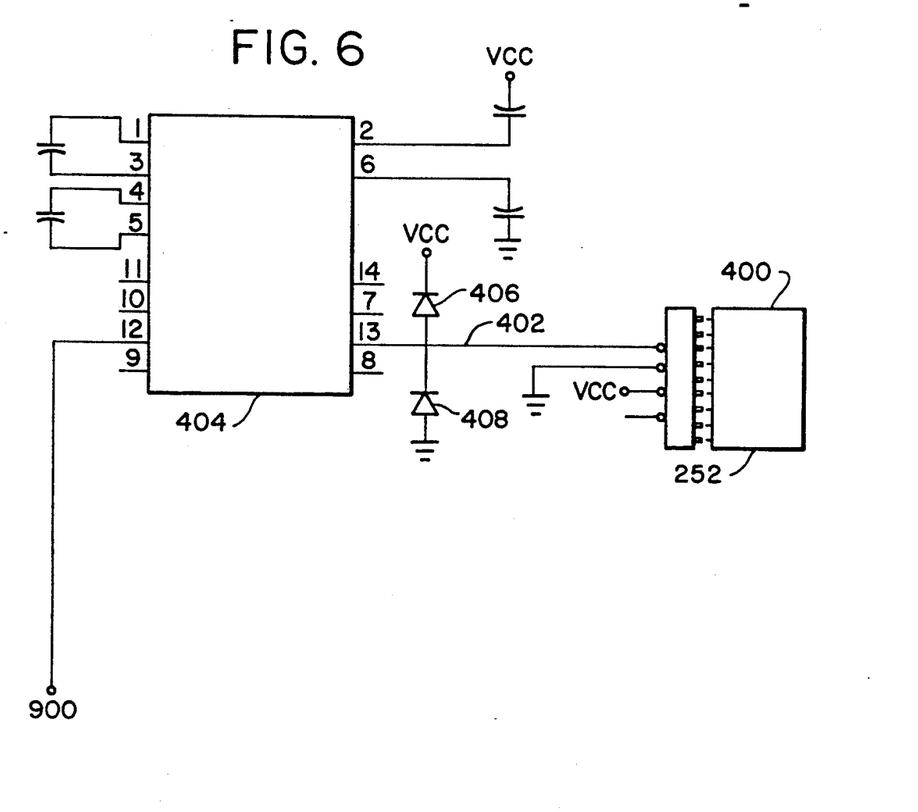

FIG. 6 shows the circuitry for converting the logic level of code reader 252 to the logic level used by microprocessor 250 in FIG. 5. Code reader 252 is preferably a commonly found optical bar code reader or it may be any other self-supporting reading device. FIG. 6 includes plug 400 for connection to code reader 252. The output from code reader 252 appears on line 402 for input to pin 13 of chip 404. Transients on line 402 are filtered by diodes 406 and 408. Chip 404 is preferably integrated circuit MAX232CPL manufactured by Maxim Integrated Circuits. The remaining circuit connections for chip 404 shown in FIG. 6 are well known in the art. The output of chip 404 at pin 12 is the logical equivalent of the logic signals appearing on line 402; however, the logic output at pin 12 of chip 404 is modified to be compatible for input to microprocessor 250 in FIG. 5.

Figure 7:
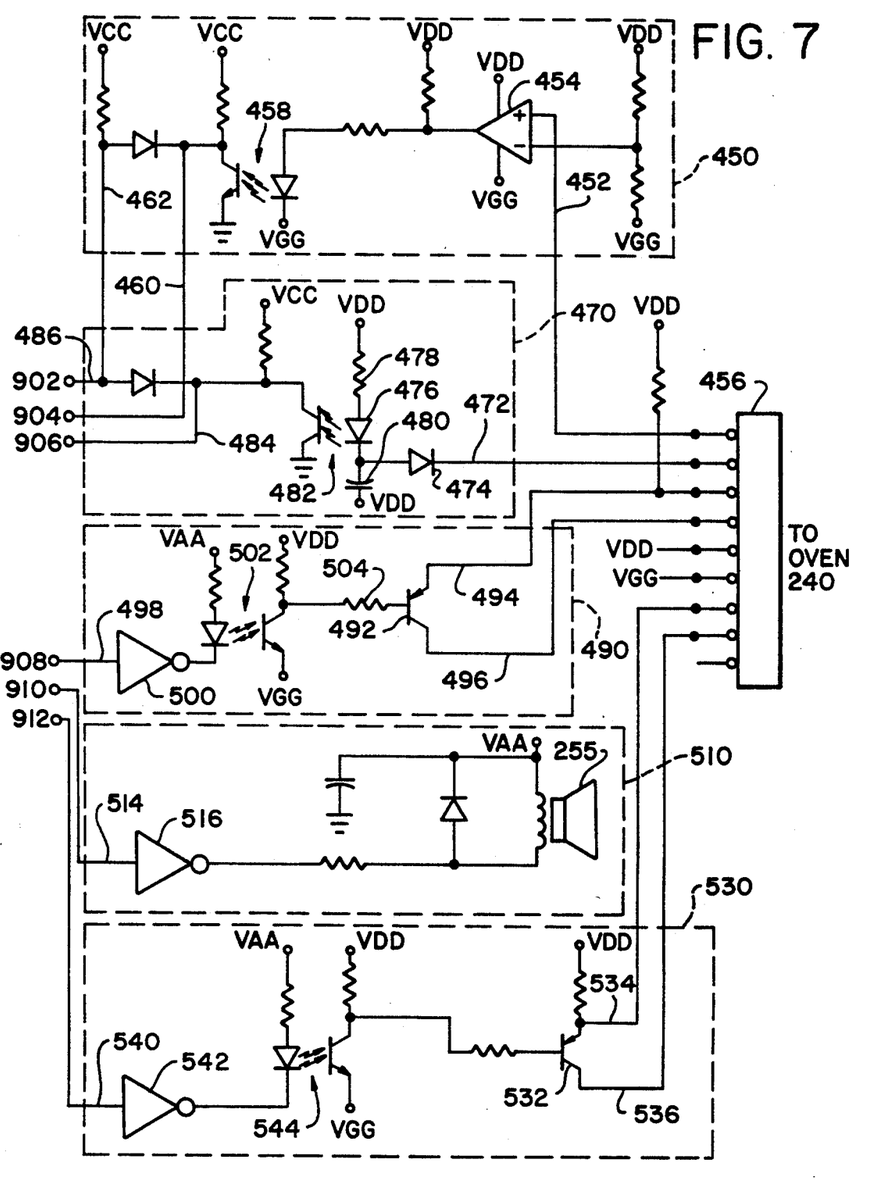

FIG. 7 includes the circuitry for interfacing the user prompts in commercial oven 240 with the present embodiment and for creating other user prompts. The circuitry shown within dashed line 450 is used to sense when door 246 on commercial oven 240 is open. Line 452 is connected to the door indicator circuitry 249 on commercial oven 240 through connector 456. Line 452 thereby receives the "door open" signal generated by commercial oven 240. When door 246 is open, amplifier 454 receives the door open signal over line 452 and outputs a signal which passes through optical coupler 458. The signal then passes over lines 460 and 462 and is received by microprocessor 250 in FIG. 5 through pins 2 and 4. Microprocessor 250 thereby uses the circuitry within dashed line 450 to determine the position of door 246.

The circuitry within dashed line 470 is used to demodulate the horn signal applied to horn 248 in commercial oven 240. Line 472 is connected to horn 248 through connector 456. Diode 474, diode 476, resistor 478, and capacitor 480 demodulate the signal applied to horn 248. This demodulator circuitry converts the horn signal into a series of square waves representative of the number of horn blasts. For example, for a horn signal consisting of three blasts, the output of the demodulator circuitry would be three square waves. Optical coupler 482 is positioned to pass the square waves over lines 484 and 486 thereby allowing microprocessor 250 to count the number of horn blasts. Microprocessor 250 is programmed to know the circumstances in which commercial oven 240 may generate a single, double or triple horn blast. By knowing the number of horn blasts, microprocessor 250 thereby knows the present operating condition of commercial oven 240. For example, a triple horn blast indicates either that commercial oven 240 has finished a cooking cycle or that door 246 has been opened. When such a triple blast occurs, microprocessor 250 checks the circuitry within dashed line 450 to see if door 246 is open. If not, the three horn blasts indicate the end of a cooking cycle and microprocessor 250 can then implement the next cooking cycle as may be required by the recipe.

The circuitry shown within dashed line 490 in FIG. 7 is used to override the operation of horn 248 in commercial oven 240 to prevent a horn signal during times when one would otherwise occur but is not needed. This is accomplished by connecting transistor 492 via lines 494 and 496 and connector 456 in series with the control line (not shown) for horn 248 in commercial oven 240. During normal operation, transistor 492 is rendered conductive so that control of horn 248 is maintained by commercial oven 240. During a period of time when microprocessor 250 desires to override the commercial oven's control of horn 248, microprocessor 250 will cause transistor 492 to be non-conductive thereby opening the control line to horn 248. Microprocessor 250 thus achieves control over horn 248 via line 498, inverting amplifier 500, optical coupler 502, and resistor 504.

The circuitry shown within dashed line 510 is the circuitry for controlling a second horn 255 which is a component of the present embodiment of the invention and under the exclusive control of microprocessor 250. Horn 255 is used to create user prompts during the programming and cooking modes of the present embodiment. Microprocessor 250 controls horn 255 via line 514, inverting amplifier 516, and the related circuitry shown within dashed line 510.

The circuitry shown within dashed line 530 is controlled by microprocessor 250 to override display 247 in commercial oven 240. Transistor 532 is connected via lines 534 and 536 and connector 456 to the output drive (not shown) for display 247. When transistor 532 is open circuited, the output drive for display 247 is disconnected. Microprocessor 250 controls transistor 532, and thereby display 247, via lines 540, amplifier 542, optical coupler 544 and the related circuitry.

Control over display 247 is necessary during a multiple cooking cycle recipe. Because this embodiment of the present invention is a retrofit for commercial oven 240, the implementation of a multi-step recipe appears to commercial oven 240 as two separate cooking cycles. At the end of the first cooking cycle, commercial oven 240 will attempt to sound horn 248 and output the user prompt: "COOKING CYCLE COMPLETED" on display 247 when, in fact, there remains a second cooking cycle. Microprocessor 250 thereby uses the circuitry within dashed line 530 in FIG. 7 to override display 247 during such times.

Figure 8:
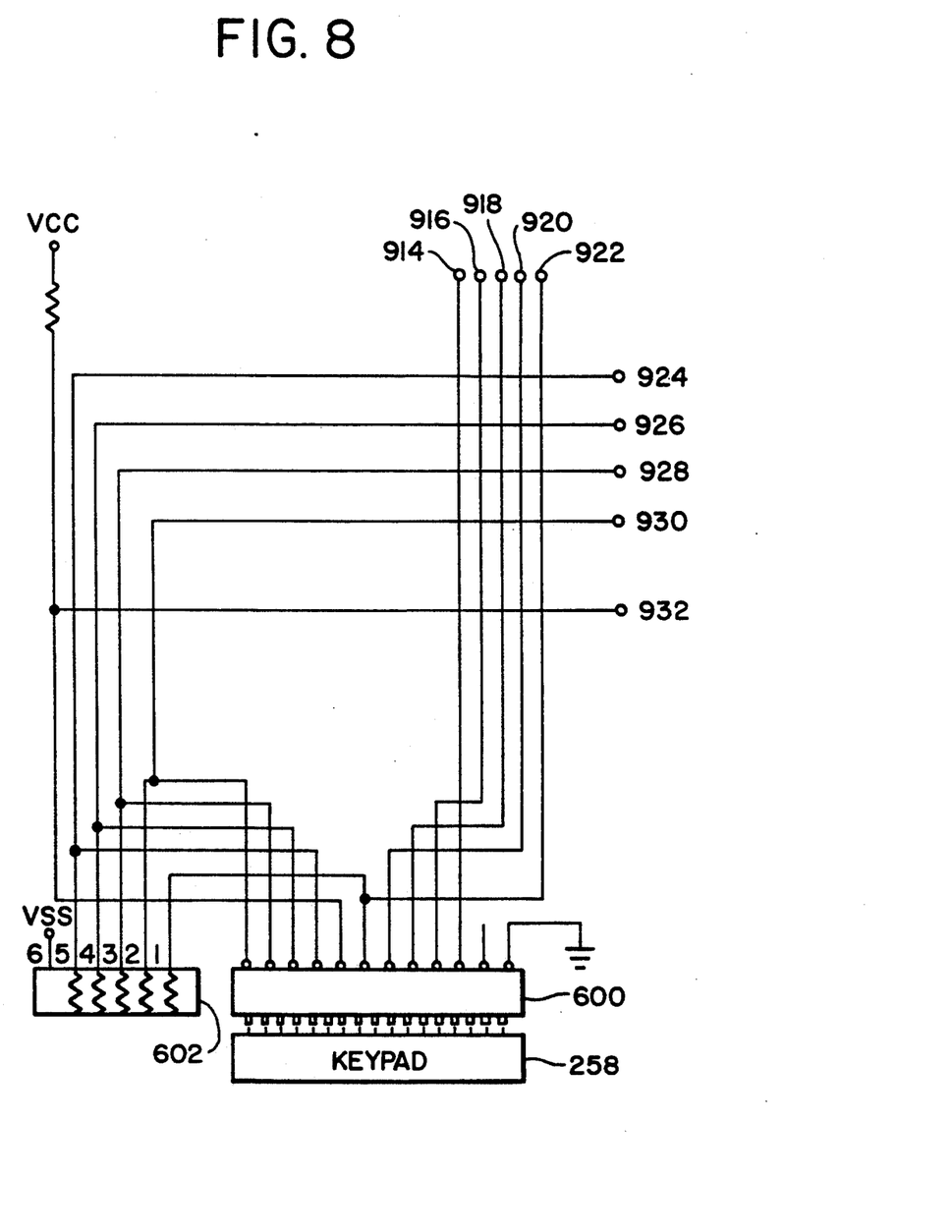
Figure 9:
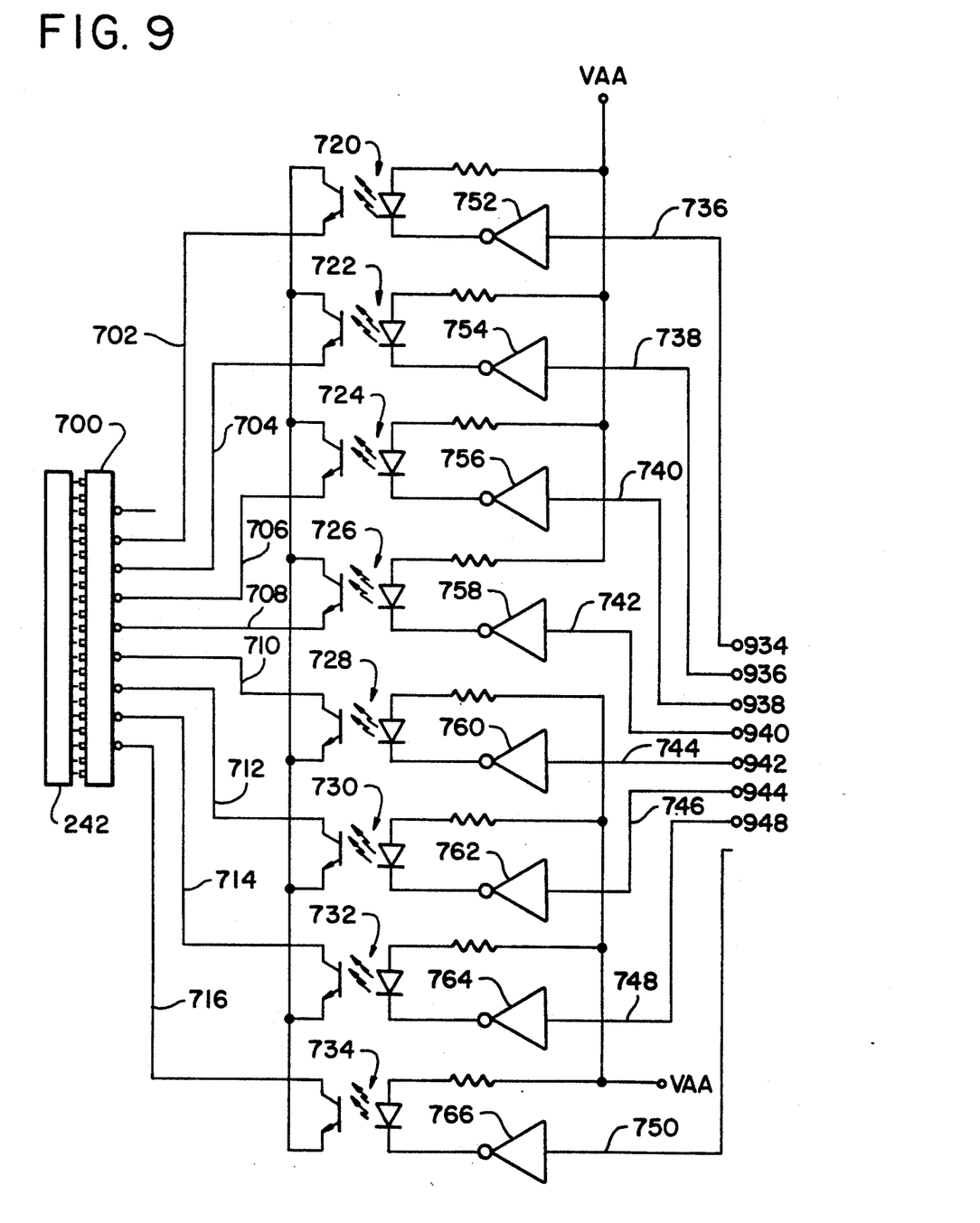

FIG. 8 shows the circuitry for connecting key pad 258 to microprocessor 250. Key pad 258 is connected through plug-in connector 600 and is used for programming a recipe. FIG. 8 includes resistor block 602 for setting appropriate logic levels. When microprocessor 250 is not being programmed, key pad 258 may be disconnected from connector 600 to allow the user to store key pad 258 until the next use.

FIG. 9 contains the circuitry for controlling key pad 242 on commercial oven 240. The wires in FIG. 9 which pass through connector 700 are connected to the contact pins on the opposite side of key pad 242. Lines 702, 704, 706, and 708 are used to control the four rows of key pad 242. Lines 710, 712, 714, and 716 are used to control the four columns of key pad 242. Thus, by specifying a particular row and column, a particular key on key pad 242 is electrically selected.

The circuitry of FIG. 9 makes the row and column selection, and thereby selects a particular key on key pad 242, by selectively rendering pairs of optical couplers 720 through 734 conductive. First, the row in which the key to be selected occurs is selected by rendering conductive the respective optical coupler from 720 to 726. Second, the column in which the key to be selected occurs is selected by rendering conductive the respective optical coupler from 728 to 734. When two said optical couplers are thereby rendered conductive, one of the lines 702 through 708 will be in electrical connection with one of lines 710 through 716 and a single key will thereby be uniquely selected. Microprocessor 250 in FIG. 5 controls this entire process through control of optical couplers 720 through 734 via lines 736 through 750, amplifiers 752 through 766, and the related circuitry. Accordingly, microprocessor 250 implements the stored recipes by electrically inputting the required steps through key pad 242 on commercial oven 240.

In operation, the circuitry of FIGS. 4 through 9 can be used to implement a series of preprogrammed recipes on commercial oven 240. In order to do this, a user reads the code on the food product to be cooked with code reader 252. A tone from horn 255 indicates that the read was successful. If a double error tone is heard, it indicates a bad code or damaged print. If the code is a UPC code, a double error tone indicates there is no recipe stored in memory 256 for the particular code.

After the food product has been scanned and the single tone is heard, the user opens door 246 and places the food product in commercial oven 240 and shuts door 246. The cook time now appears on display 247 and the cook cycle begins. If the cycle is interrupted by door 246 being opened, display 247 will be reset when door 246 is reclosed and commercial oven 240 is ready for another cook cycle.

In order to program the embodiment of FIGS. 4 through 9, the following steps should be taken. First, there are four functions that can be used in the programming mode: (1) CHANGE- to change cooking times; (2) ADD- to add an additional item to memory; (3) DELETE- to remove a recipe from memory; and (4) CLEAR- to clear cook times or other information entered through key pad 258 without affecting stored recipes.

In order to initiate the program mode, key pad 258 should be connected to connector 600 in FIG. 8. When key pad 258 is successfully connected, a single tone is heard from horn 255. If at any point during the programming mode key pad 258 is disconnected, the programming mode ends and is cleared. Commercial oven 240 then returns to the normal cooking mode.

In order to add a recipe to the memory 256, the user scans the code with code reader 252 and presses the DELETE key on key pad 258. This deletes any stored information concerning the scanned code. This avoids the situation of having multiple recipes stored for the same code.

The product code should be scanned a second time and the user presses the COOK TIME key on key pad 258 to set the correct cook time. The user then presses the POWER key on key pad 258 and then presses a key for either 100%, 80%, 50%, 30%, or DEFROST. There may be up to two cooking stages. In the event of two stages, the user starts the second stage by pressing the COOK TIME key as for the first stage and again enters the desired times and powers. The user then presses the ADD key on key pad 258 to add the selection to memory 256. When a recipe is successfully added to memory 256, a single tone will be heard from horn 255. If the double error tone is heard, it indicates an error from key pad 258 during entry of the recipe or that there is no more room in memory 256 for the additional recipes and products. If more than four digits of cook time are pressed, an error tone will again be sounded. The food product will need to be rescanned in order to program a recipe for it.

The following is an example of a one-stage programming sequence:

SCAN-COOK TIME-4-5-POWER-100%-ADD.

This was a cook time of 45 seconds at 100% power. The following illustrates a two-stage programming sequence:

SCAN-COOK
TIME-1-0-0-POWER-DEFROST-COOK

TIME-5-5-POWER-80%-ADD.

This is a one minute defrost time followed by a 55 second cook time at 80%.

To change the recipe for an existing food product, the product code on the food product should be scanned with code reader 252. The user then enters the appropriate cook times and cooking powers as when adding a product recipe. The user presses the CHANGE key on key pad 258 to modify the existing recipe. If the double error tone is heard, either there is an entry error from key pad 258 or there was no product to be changed in memory 256.

To delete an item from memory 256, the product code on the food Product should be scanned and then the user presses the DELETE key on key pad 258. If an error tone is heard, the product was not present in memory 256 to be deleted.

The clear function will clear the scanned code and the cooking times entered from key pad 258. The product will need to be re-scanned to input a recipe for the product.

To terminate the programming mode, the user unplugs key pad 258 at connector 600 in FIG. 5. Commercial oven 240 is now ready to implement a recipe or to function in its conventional mode.

Both disclosed embodiments of the present invention thus provide a programmable recipe implementation system for cooking devices. In one embodiment, the system may be integrated into the control apparatus of the cooking device. In another embodiment, an existing microwave oven may be retrofitted with the invention.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A programmable cooking system for use with a cooking device and a plurality of food products, each food product bearing an identifying code, said cooking system comprising:
   a memory;
   means for reading the identifying code on a selected one of the food products;
   user programmable means for inputting into the memory a sequence of cooking instructions corresponding to the identifying code read by the reading means;
   means for recalling the sequence of cooking instructions from the memory which corresponds to an identifying code read by the reading means; and
   means for controlling the operation of the cooking device as a function of the sequence of cooking instructions recalled by the recalling means;
   wherein said cooking system has two modes of operation:
   a programming mode wherein the identifying code on each of the selected food products is read by the reading means and a separate sequence of cooking instructions is input into the memory via the user programmable means so that each identifying code corresponds to a separate sequence of cooking instructions in the memory; and
   a cooking mode wherein the identifying code on a selected food product is read by the reading means and the corresponding sequence of cooking instructions is recalled from the memory by the recalling means for use by the controlling means in controlling the operation of the cooking device according to said cooking instructions.

2. The cooking system of claim 1 wherein the reading means further comprises an optical code reader.

3. The cooking system of claim 1 wherein the reading means further comprises means for reading a universal product code printed on the selected food product.

4. The cooking system of claim 1 wherein the user programmable means further comprises means for entering a base amount of food to be cooked in a set of cooking instructions; wherein the controlling means further comprises means for inputting a value representative of the actual amount of food to be cooked in a given operation of the cooking device; and wherein the controlling means controls the cooking device as a function of the base amount and the actual amount.

5. The cooking system of claim 4 wherein the reading means further comprises an optical code reader.

6. The cooking system of claim 4 wherein the reading means further comprises means for reading a universal product code printed on the selected food product.

7. The cooking system of claim 4 wherein the user programmable means further comprises means for compressing the sequences of cooking instructions and for inputting them into the memory in a compressed format, and wherein the recalling means further comprises means for recalling the sequences of cooking instructions in a compressed format and for expanding them into a format compatible for use by the controlling means in controlling the cooking device.

8. The cooking system of claim 4 wherein the memory further comprises a table of memory locations for storing a cooking time period and a power setting for each sequence of cooking instructions.

9. The cooking system of claim 1 wherein the user programmable means further comprises means for compressing the sequences of cooking instructions and for inputting them into the memory in a compressed format, and wherein the recalling means further comprises means for recalling the sequences of cooking instructions in a compressed format and for expanding them into a format compatible for use by the controlling means in controlling the cooking device.

10. The cooking system of claim 1 wherein the memory further comprises a table of memory locations for storing a cooking time period and a power setting for each sequence of cooking instructions.

11. An automatic cooking system for use with a plurality of food products, each baring an identifying code, said cooking system comprising:
   a cooking device;

a memory;

an optical code reader for reading the identifying codes on a selected one of the food products;

user programmable means for inputting into the memory a sequence of cooking instructions corresponding to the identifying code read by the optical code reader;

means for recalling the sequence of cooking instructions from the memory which corresponds to an identifying code read by the optical code reader; and means for controlling the operation of the cooking device as a function of the sequence of cooking instructions recalled by the recalling means;

wherein said cooking system has two modes of operation;

a programming mode wherein the identifying code on each of the selected food products is read by the reading means and a separate sequence of cooking instructions is input into the memory via the user programmable means so that each identifying code corresponds to a separate sequence of cooking instructions in the memory; and a cooking mode wherein the identifying code on a selected food product is read by the reading means and the corresponding sequence of cooking instructions is recalled from the memory by the recalling means for use by the controlling means in controlling the operation of the cooking device according to said cooking instructions.

12. The cooking system of claim 11 wherein the cooking device further comprises a microwave oven.

13. The cooking system of claim 11 wherein the cooking device further comprises a convection oven.

14. The cooking system of claim 11 wherein the reading means further comprises an optical code reader.

15. The cooking system of claim 11 wherein the reading means further comprises means for reading a universal product code printed on the selected food product.

16. The cooking system of claim 11 wherein the user programmable means further comprises means for entering a base amount of food to be cooked in a set of cooking instructions; wherein the controlling means further comprises means for inputting a value representative of the actual amount of food to be cooked in a given operation of the cooking device; and wherein the controlling means controls the cooking device as a function of the base amount and the actual amount.

17. The cooking system of claim 16 wherein the reading means further comprises an optical code reader.

18. The cooking system of claim 16 wherein the reading means further comprises means for reading a universal product printed on the selected food product.

19. The cooking system of claim 16 wherein the user programmable means further comprises means for compressing the sequences of cooking instructions and for inputting them into the memory in a compressed format, and wherein the recalling means further comprises means for recalling the sequences of cooking instructions in a compressed format and for expanding them into a format compatible for use by the controlling means in controlling the operation of the cooking device.

20. The cooking system of claim 16 wherein the memory further comprises a table of memory locations for storing a cooking time period and a power setting for each sequence of cooking instructions.

21. The cooking system of claim 11 wherein the user programmable means further comprises means for compressing the sequences of cooking instructions and for inputting them into the memory in a compressed format, and wherein the recalling means further comprises means for recalling the sequences of cooking instructions in a compressed format and for expanding them into a format compatible for use by the controlling means in controlling the operation of the cooking device.

22. The cooking system of claim 11 wherein the memory further comprises a table of memory locations for storing a cooking time period and a power setting for each sequence of cooking instructions.

23. A programmable cooking system for use with a plurality of food products, each bearing an identifying code, said cooking system comprising:

a cooking device having controls for controlling the operation of the cooking device;

an optical code reader for reading the identifying code on a selected one of the food products;

a keypad;

a memory; and a microprocessor including an input connected to the optical code reader, the keypad and the memory, and having an output connected to the memory and the controls and having a programming mode and an operating mode;

wherein said microprocessor in the programming mode stores in memory identifying codes read by the optical code reader and corresponding cooking instructions input via the keypad by an operator; and wherein said microprocessor in the cooking mode retrieves from the memory cooking instructions corresponding to an identifying code read by the optical code reader, said microprocessor controlling the controls of the cooking device in accordance with retrieved cooking instructions whereby the operator stores in the memory cooking instructions corresponding to a particular identifying code and the operation of the cooking device is controlled in response to cooking instructions corresponding to the particular identifying code read by the optical code reader.

24. The cooking system of claim 23 wherein the cooking device further comprises a microwave oven.

25. The cooking system of claim 23 wherein the cooking device further comprises a convection oven.

26. The cooking system of claim 23 wherein the optical code reader further comprises an optical code reader.

27. The cooking system of claim 23 wherein the optical code reader further comprises means for reading a universal product code printed on the selected food product.

28. The cooking system of claim 23 wherein the microprocessor further comprises means for compressing the sequences of cooking instructions and for inputting them into the memory in a compressed format, and wherein the microprocessor further comprises means for recalling the sequences of cooking instructions in a compressed format and for expanding them into a compatible format for controlling the controls of the cooking device.

29. The cooking system of claim 23 wherein the memory further comprises a table of memory locations for storing a cooking time period and a power setting for each cooking instruction input via the keypad.

* * * * *